March 21, 1961  G. W. WRIGHT ET AL  2,975,765
FLUID METER
Filed March 20, 1959  2 Sheets-Sheet 1

GEORGE W. WRIGHT
BURDETTE W. FOSS
PAUL T. KACHUK
*INVENTORS*

BY Edmund W.E. Kamm
ATTORNEY

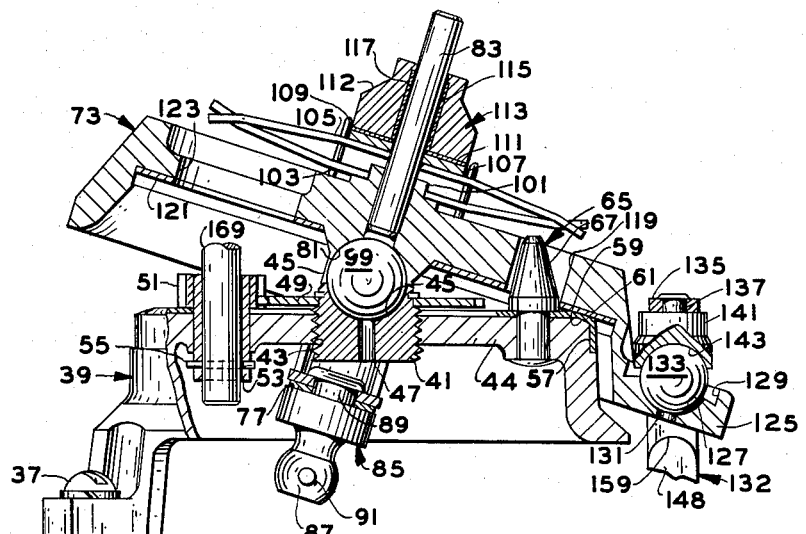

United States Patent Office 2,975,765
Patented Mar. 21, 1961

2,975,765

FLUID METER

George W. Wright, Yoder, and Burdette W. Foss and Paul T. Kachuk, Fort Wayne, Ind., assignors to Tokheim Corporation, Fort Wayne, Ind., a corporation of Indiana Filed Mar. 20, 1959, Ser. No. 800,822

25 Claims. (Cl. 121—69)

This invention relates to fluid meters and, more specifically, it relates to positive displacement volume meters used for measuring petroleum products such as gasolines, diesel fuels, heating oils and similar liquids.

The primary objects of the invention are to provide a meter of the kind described which is constructed so as to minimize wear and corrosion, thereby extending the total life of the meter and the length of period between recalibrations, as well as to extend the range of liquids which can be metered by the instrument; which is provided with a mechanism for increasing the range of calibration so as to extend the total life of the meter and simplifying the problems of gearing the meter to a register or other read out device and which is simplified in construction so as to reduce the cost of fabricating and assembling parts and to permit the use of better and more expensive materials without greatly increasing the cost of the meter.

These and other objects will become apparent from a study of this specification and the drawings which form a part hereof and in which:

Figure 2 is a sectional elevation of the valve mechanism of the meters with certain parts rotated out of actual position to display them.

Figure 3 is a side elevation of a piston assembly.

Figure 4 is a plan view of the valve and shows its relation to the fluid ports.

*Mechanical structure*

Figure 1:
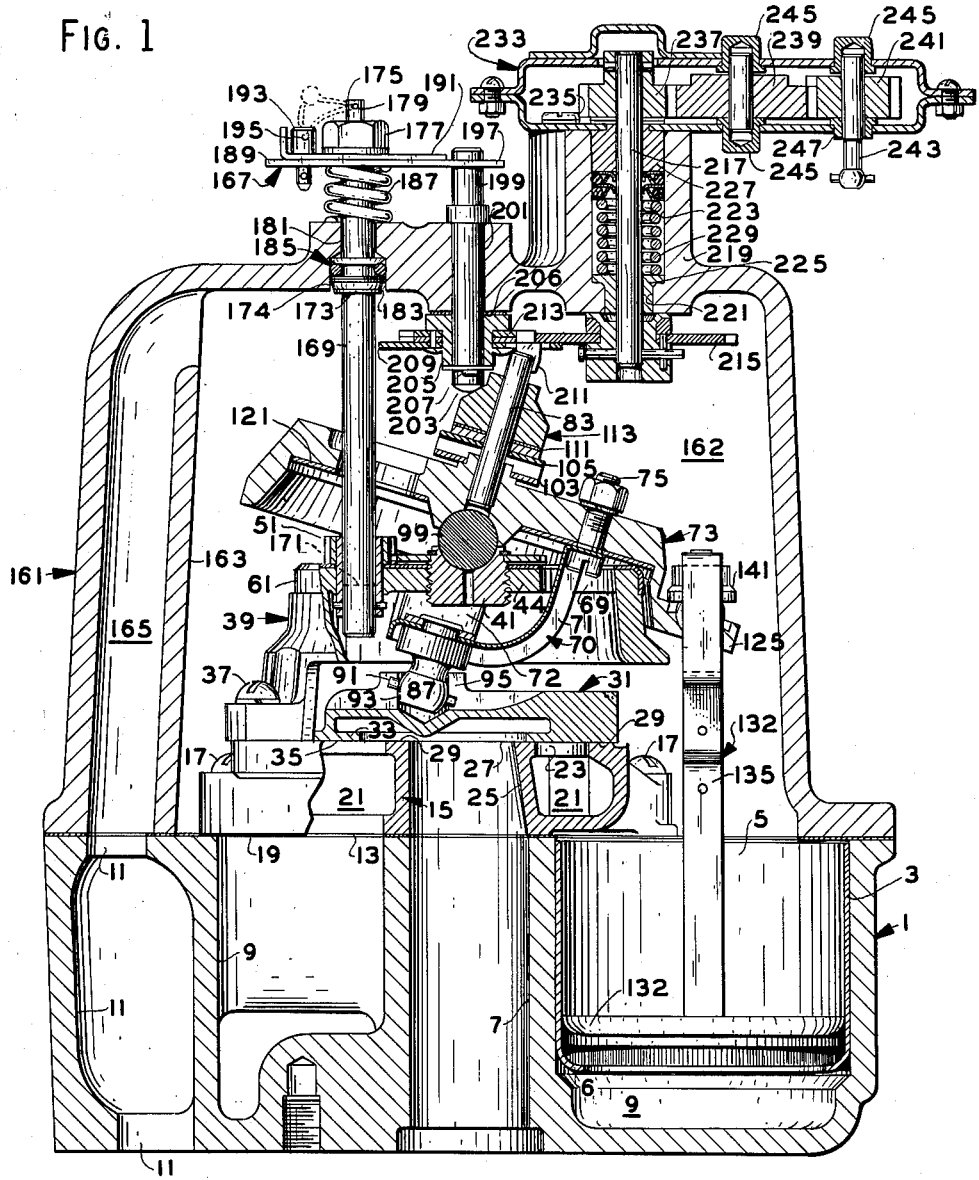
Figure 1 is a sectional elevation of the meter.

Referring to Figure 1, the numeral 1 indicates the cylinder block which is bored from the top to provide three cylinders 3 which are disposed on parallel vertical axes which are symmetrically arranged about the vertical axis of the block. The bottoms of the cylinders are closed and each cylinder is fitted with a liner 5 of seamless, stainless steel tubing. The lower end of each liner has an inward flange 6 at its lower end to serve as a piston stop for assembly purposes.

An outlet passage 7 extends coaxially through the block and an inlet passage 11 extends through the block, parallel to 7 but at one side of the block. Three channels 9, extend one from the bottom of each cylinder, upwardly through the block and terminate in openings 13 which are disposed symmetrically about the opening of the outlet passage in the top surface of the block.

A port member 15 is sealingly mounted on the upper face of the block by screws 17 and a gasket 19, and defines three separate chambers 21, each of which communicates with one of the openings 13. A valve port 23 is defined by the top of each chamber which is also ground to provide a valve seat 29. The three ports are elongated, have straight sides and are arranged symmetrically about the central axis with their sides disposed along the sides of an equilateral triangle as shown in Figure 4.

The member 15 is also provided with a discharge channel 25 having a port 27 which opens through the valve seat and has an equilateral, triangular form with its sides parrallel to those of the ports.

A valve 31 of inverted, cupped construction is rimmed on its bottom side by a flange 33 which is ground to provide a flat seating surface 35. This surface is substantially in the form of an equilateral triangular ribbon having a width which is slightly wider than the width of valve ports 23 so that it is capable of closing the corresponding port and having a slight lap.

The valve is held with the edges of each side parallel to the edges of the port which is controlled by that side and is moved cyclically, in an orbital path so as to successively expose each port exteriorly of the valve, cover the port, expose it interiorly of the valve to connect the port with the discharge port 27, again cover the port to start a new cycle.

Mounted on the member 15 by screws 37 is a support 39 (Fig. 2). An adjustment screw or support 41 is mounted coaxially with port 27 and ports 23, in a threaded opening 43 in the top wall 44 of the support. The upper end of the screw is formed with a spherical socket 45 which communicates with an axial hole 47 which permits liquid to enter the socket for lubricating it and permits water to drain from the socket.

A relatively thin gear 49 is fixed to the upper portion of the screw and meshes with a wide faced pinion 51 which has its hub 53 rotatably mounted in the top wall 44 of the support 39. A wire 55 is passed through the hub and has its free ends bent around the hub to contact the under side of the wall 44 to prevent withdrawal of the pinion therefrom. The part of the pin inside the hub is spanned by the bifurcated end of the adjusting shaft 169 described below.

The support 39 has its upper end machined axially so as to provide an upwardly extending axial boss 57 which has its edge bevelled at 59 to define a track. A stamped, sheet metal cap or wear plate 61 is formed so as to fit the boss and bevel closely, to form a sheath therefor, the sheath being fully supported or "backed up" by the track.

Four shouldered guide pins 65 (Fig. 2), have their stems passed through the cap and boss and are riveted in place so as to hold the cap on the boss and track. The upper ends of the pins have an upwardly converging, conical surface 67 which terminates in a chamfered end. The pins are disposed equidistantly from and about the vertical central axis of the support.

Three openings 69, only one of which is shown in Figure 1, the other two being disposed on either side of and spaced 90 degrees from that shown, are formed in the cap and the top wall of the support.

A three armed valve actuated element or bracket 70 has its arms 71, 72 extending upwardly through the openings and the upper ends of the arms are fastened to the bottom side of a wobble plate 73 by bolts 75. Two of the arms, one of which is shown at 72, are disposed opposite to each other and the third, indicated by 71, is spaced equidistantly from the others.

All of the arms are curved downwardly and inwardly from their points of connection with the wobble plate and merge into a platform 77 which is disposed parallel to the wobble plate so as to be intersected by the central axis thereof. The element or bracket 70 is preferably made as a stamping.

The wobble plate has a generally frustoconical shape and has a downwardly open spherical socket 81 disposed on the central axis. A shaft or stud 83 is fixed in the top of the wobble plate and extends coaxially thereabove.

A shouldered journal member or support 85 has a spherical journal 87 disposed coaxially with its mounting projection 89 which is fixed in the platform 77 so that the journal 87 and projection are coaxial with socket 81 and stud 83.

An aligning pin or key 91 is passed through the center of journal 87, substantially perpendicular to the axis of support 85 and is fixed therein so as to project from both sides of the journal.

The upper side of valve 31 (Figs. 1 and 4) is provided with a central, upwardly open recess 93 which rotatably receives the journal 87. This recess is intersected by a slot 95 which receives the key 91. The slot and key thus constitute valve guide means which prevent rotation of the valve about the axis of the journal support. The key and slot are preferably aligned with a bisector of one of the angles formed by the sides of the valve and serve to hold the edges of the valve parallel to the edges of the valve ports 23.

A ball bearing 99 is inserted in the spherical sockets 81 and 45 of the wobble plate and adjusting screw respectively.

The wobble plate is formed with an axially extending boss 101 concentric with shaft 83. A spring device, comprising two leaves 103 and 105 which are bowed in opposite directions and arranged with their concave sides adjacent each other, is mounted on the boss 101 and shaft 83 by means of perforations at the center of each leaf. The ends of the leaves are interlocked against relative rotational displacement and are held together by cotter pins 109 which also hold a washer 107 on the upper leaf (Fig. 5).

A thrust washer 111 is loosely mounted on shaft 83 so as to bear on 107. A thrust roller 113 is rotatably mounted on the shaft so as to rest on washer 111. The roller is counterbored from the bottom at 115 and a bearing 117 is inserted therein.

The top wall of the wobble plate contains four holes 119 which are disposed symmetrically about shaft 83 on perpendicular diameters of the plate and which are elongated slightly along these diameters. The holes are located so that the pins 65 will enter them as the plate nutates on the track and will cooperate with the lower edges of the holes to prevent precession of the plate on the track.

A bearing plate or disc 121 of sheet metal is held in place on the bottom of the wall by the bolts 75 and member 70, in a position to ride on the cap 61.

Three equally spaced, coplanar arms 125 extend radially outwardly from the bottom edge of the plate so that their radial center lines will substantially intersect the vertical axes of the corresponding cylinders 5. The upper surface of each arm is formed with a socket 129 (Fig. 2) having a spherical bearing seat 127. The seat has a small lubricating and drain duct 131. A ball bearing 133 rests on the seat to support the piston assembly 132.

As shown in Figures 1 and 3, a piston rod 135 is formed of flat bar stock which is perforated centrally at 137 to receive the stem 139 of an inverted bearing 141. The stem is coaxial with a downwardly open spherical seat 143 and is riveted in the hole 137.

The portions of the bar extend from the opposite sides of the hole for a short distance and are bent downwardly into parallelism. They extend for a short distance and are then bent inwardly, to form a loop or stirrup 136, and are again bent downwardly into parallel, spaced runs A. They are thereafter further bent inwardly and downwardly so as to extend in mutual contact and their ends are bent outwardly to form coplanar ears 147 which are perforated at 149.

A keeper or stop means 148 made of stock similar to the rod, is inserted in the recess 145 formed by runs A, A, so as to extend into the stirrup and is welded in place. A circular guide plate 151, a cylinder seal member or cup 153 and a follower plate 155 are fastened to ears 147 by rivets 157 which enter holes 149.

The free end of the keeper is preferably rounded edgewise as shown at 159 in Figures 2 and 3. When the keeper occupies its full line position (Fig. 3), it will contact the under side of arm 125, if the piston assembly 132 is lifted relative to the arm, and prevents bearing seat 143 from moving away from seat 127 far enough to permit ball 133 to escape. To install or remove the piston assembly, it is necessary to bend the keeper to a position such as that shown by dashed lines in Figure 3.

Referring again to Figure 1, a deep, cup shaped cover 161 is mounted in inverted position on the block to define an inlet chamber 162 therewith, and is held in place by suitable cap screws. The cover has a baffle 163 disposed radially inwardly from the cover sidewall, which extends from the top of the block 1 to a point below the top of the cover and defines, with the cover, an extension 165 of the inlet passage.

A calibration adjustment mechanism indicated generally by 167 comprises a shaft 169 having a diametrically extending slot 171 at its lower end which is adopted to receive the wire 55, having collar 173 formed intermediate its ends, having a projection 175 of reduced diameter at its upper end and threads immediately below the projection to receive the nut 177. The projection is cross-drilled at 179 to receive a seal wire.

The cover is provided with a hole 181 which serves as a bearing for the shaft and the hole is counterbored at 183 to receive a seal mechanism 185.

A helical spring 187, which is mounted on the outer portion of the shaft, bears at one end on the cover 161 and at the other on a pin plate 189 which is rotatable on the shaft. A second pin plate 191 is keyed to the shaft so as to rotate therewith and is held in place by the nut 177 which is screwed on the shaft threads.

The spring 187 acts on plates 189, 191 and nut 177 so as to urge the shaft 169 upwardly, thereby causing collar 173 to compress the seal 185.

The pin plates have a series of circumferentially distributed holes of the same size and disposed on equal radial distances from the axis of shaft 169. The number of holes in one plate exceeds that in the other by one so that the spacing between the holes of the one plate is slightly less than that of the holes in the other to provide a vernier, rotative adjustment of one plate relative to the other. The adjustment is held by a pin 193 which is inserted in the two holes which happen to be aligned when the proper setting of the plates is reached and by the seal which is inserted in the transverse hole 195 in the pin.

The pin plate 189 has an extension 197 which is perforated to fit slidably over a post 199 which is sealingly fixed in opening 201 in the cover. The post extends through the cover and has a rounded end 203 against which the conical surface 112 of the roller 113 is urged by the bow-spring 103—105. This mechanism serves to hold the disc 121 of the wobble plate in yieldable engagement with the cup or track 61 of support 39 to insure the full stroking of the pistons and full orbital travel of the valve.

A hub 205 is rotatably mounted on the inner end of post 199 by a washer and a pin 207 and bears on a thrust washer 206. A drive plate 209 and a gear 213 are fixed to the hub. The drive plate has one or more depending ears 211 which extend into the path of the end of shaft 83 so as to be driven thereby. The gear 213 meshes with gear 215 which is fixed to the output shaft 217.

This shaft is rotatably mounted in bearings 225 and 227 which are fitted in a bore 221 and a counterbore 223 respectively, formed in an upstanding boss 219 of the cover 161. A seal mechanism is compressed between bearing 227 and a spring 229 disposed in the counterbore.

A gear case 233 is mounted on the top end of boss 219 by screws 235. The upper end of output shaft 217 extends into the case and through the drive pinion 237 which is fixed to the shaft. The pinion meshes with an idler 239 which in turn drives a final gear 241 which is fixed to the register connecting shaft 243. The shafts of gears 239 and 241 are mounted in cup shaped bearings 245 which are supported in the case. The bearing 247 through which the shaft 243 extends is a flanged bearing. The flanges of bearings 245 and 247 serve as thrust bearings for the gears. Obviously the bearings 245 and 247 for shaft 243 may be interchanged and the shaft and gear may be inverted so that the shaft will extend upwardly out of the case if desired.

Also the gears 237, 239 and 241 may be replaced with gears of different diameters while maintaining the same center distances of the shafts so that the various ratios between the speeds of shafts 217 and 243 necessary to drive various registers can be attained.

Operation

Liquid under pressure enters chamber 162 through inlet passages 11 and 165 and passes through any port 23 which happens to be uncovered by the outside periphery of the valve. Thereafter such liquid passes downwardly through such ports 23, the corresponding chambers 21 of the port member 15 and the channels 9 of the cylinder block 1 to the corersponding cylinders 3, underneath the pistons 132.

It will be seen that the upper sides of pistons 132 are continuously subjected to the liquid under pressure in chamber 162.

Other of the ports 23 are uncovered by the inner periphery of the valve and communicate, through the interior valve, with the discharge port 27, so that liquid can flow from the corresponding cylinders through the corresponding channels 9, chambers 21, the valve ports 23, valve cavity, discharge port 27 and the channel 25 to the discharge passage 7. Obviously the valve will close a port 23 only twice in a cycle in passing across the port in opposite directions and this closure must occur when the corresponding piston is substantially at top or bottom dead center.

The piston shown in Figure 1 is at the bottom of its stroke. It has thus completed its discharge of measured liquid and has caused the valve 31 to move far enough to close the port 23 for its cylinder. The second piston on the side of the sheet opposite the viewer is connected in communication with the outlet port 27 by the valve and is descending to cause the wobble plate to roll on its track and thereby shift the valve so as to expose the port of the piston shown, to chamber 162 and thereafter to lift the piston shown. While the latter piston is rising, it is subjected to a pressure differential which is substantially zero when the meter is operating slowly, because both sides of the piston are connected to chamber 162. When the meter operates rapidly, there may be a slight differential exerted in a downward direction, due to the restriction imposed by the valve port and other passages leading to the bottom side of the piston. This differential is small in comparison with the differential pressure which is acting on the descending piston and which is the full difference between the inlet and outlet pressures imposed on the meter.

Before the piston shown rises very far and before the second piston reaches the bottom of its stroke, the third piston which lies in front of the sheet, will have been raised to its top dead center position so that its cylinder is charged with a measured volume. Further descent of the second piston will shift the valve to connect the third cylinder with the discharge port so that the third piston is subjected to the full meter differential pressure and drives the wobble plate to shift the valve for the second piston to complete the lifting of the first piston.

Thus the free end of the shaft 83, when viewed from the top of the meter, will move counterclockwise in its orbit about the central axis of the meter and the pistons will be reciprocated successively and each will, in counterclockwise order, become the fluid motor which acts through the wobble plate to shift the valve and to lift the remaining pistons. The differential pressure on the pistons is always in the downward direction so that any lost motion in the mechanism is always taken up in the same direction and the pistons cannot undertravel or overtravel the stroke which is determined for them by the inclination of the wobble plate relative to the track.

This inclination can be increased or decreased by raising and lowering the ball socket 41 and ball 99 by means of the calibration mechanism comprising pin plate 191, shaft 169, pinion 51, gear 49 and the threads 43 (Figs. 1 and 2). It will, of course, be obvious that the change in inclination of the wobble plate will increase or decrease the stroke of each piston and will correspondingly change the amount of liquid drawn into and expelled from each cylinder by its piston during a cycle. The face of pinion 51 is wide enough to maintain engagement with gear 49 through the entire desired range of adjustment of the screw 41 but is narrow enough to cause gear 49 to unmesh with it before the adjusting screw 41 runs out of the threads 43.

The end of shaft 83 as it is moved orbitally, drives one of the lugs 211, gears 213, 215, shaft 217, gears 237, 239, 241 and shaft 243. The register, not shown, is connected to be driven by the shaft 243. The calibration mechanism is adjusted so that the amount of liquid actually displaced by the displacement mechanism corresponds to the amount of liquid which is shown on the register by actually operating the meter with pressure liquid and measuring the amount of liquid displaced. When the liquid and the registration agree within the tolerance set forth above, the calibration mechanism is sealed up and the meter is ready for use.

Gear boxes 233 containing gears which provide different ratios between shafts 217 and 243 may be substituted for the box shown to accommodate registers which have different gear ratios between the shaft 243 and the lowest order register wheel or which indicate in different units of liquid measure, such as liters or imperial gallons instead of U.S. gallons.

It is easy to change from one gear box to another since this requires only the removal of the gear box cap, the unpinning of gear 237 from shaft 217 and the removal of screws 235 and similar operations performed in reverse order to install a different gear box.

If it is desired to have the shaft 243 extend upwardly instead of downwardly as shown, it is necessary merely to remove the cap, reverse the bearings 245 and 247 for this shaft, reverse the shaft and reassemble the cover.

Material

As mentioned at the outset, the meter has been constructed so as to resist wear as well as to resist the corrosive action of water and of the liquids being metered, upon the various parts which are exposed to it. It was also pointed out that corrosion resistant materials are usually expensive and have qualities which are sometimes so objectionable as to preclude their use, for example, as bearings because of exceptionally high friction.

The problems of producing a meter which is corrosion resistant, operable at low head and not prohibitively expensive have been solved in the novel manner which will now be described.

The cylinders have been fitted with stainless steel liners 5 and the piston cups 153 are made of a synthetic material known as "Rulon" having a base of tetrafluoroethylene better known as "Teflon." These materials have good frictional qualities when run one on the other, have good corrosion resistance to water and to the fluids which are metered by the instrument.

The port member 15, track member 39 and wobble plate 73 which were previously made of cast iron and the valve 31 which was made of bronze, are now all made of cast iron. They are machined and thereafter are completely nickelplated to protect them from attack.

It has been found to be desirable to finish grind the surfaces of the valve and valve seat which are in mutual sliding contact, to remove the plating from them, to secure the sealing action which is necessary between them.

To prevent the separation of the nickel from the track and wobble plate along the path of rolling contact between them, the cap 61 and disc 121, both of stainless steel sheet stock, are provided.

The ball sockets 41 and 141 are made of a soft stainless steel while the ball bearings 99, 133 are made of a different grade of stainless steel and are hardened. It has been found that the friction between balls and the ball sockets mentioned is about the same as that between the balls and the sockets 81 and 127 since both sets of sockets polish during the use of the meter.

The conical guide pins 65 are of stainless steel and have sliding contact with plated surfaces of the holes in the cap. The journal member 85, bracket 70, shaft 83, roller 113 (Fig. 2) and shaft 169 are all made of stainless steel as are the drive plate 209 and gears 51, 49, 213 and 215. Washer 107 is nickel plated steel while shaft 217 is preferably chrome plated because it must withstand the friction of the seal 231. Gear hub 205 is made of leaded stainless steel.

The bearing inserts such as 115 of roller 113, gear hub 205 and the thrust washers 111 and 206 for the roller and hub, the piston cups and the main seals for shafts 169 and 217 are all made of the "Rulon" material mentioned above. The O-rings which serve as the static seals, are made of a suitable synthetic rubber.

The meter is thus constructed so as to prevent corrosion and other deterioration of the various parts of the meter which are subjected to the liquid being metered and any water which may be included therein. The provision of bearings which minimize friction between the various moving parts reduces the mechanical frictional losses in the meter to reduce the pressure drop required to operate the meter and to increase its accuracy and life.

At the same time, the use of corrosion resistant materials has been effected in such a manner as to minimize the weight of such materials used and thereby the cost of the improved instrument has been minimized.

The meter has been further improved by the elimination of certain moving parts with their attendant friction losses and the calibration adjustment has been improved to afford a wider range of adjustment which also increases the useful life of the meter by providing greater latitude of adjustment for wear.

It is obvious that various changes may be made in the form, structure and arrangement of parts of the specific embodiments of the invention disclosed herein for purposes of illustration, without departing from the spirit of the invention. Accordingly, applicants do not desire to be limited to such specific embodiments but desire protection falling fairly within the scope of the appended claims.

We claim:

1. A fluid meter comprising a cylinder block having an upright axis and defining cylinders arranged in circularly spaced relation about and parallel to said axis, a piston in each cylinder, said block defining an axial outlet passage and a fluid passage for each cylinder, a valve seat on said block defining a port for each passage, said cylinder ports being disposed about said outlet port as a center, a valve mechanism comprising a slide valve mounted on said seat, a track member mounted on said block and defining a circular track and having a first spherical journal, both centered on said axis and disposed above said valve, a wobble plate, having a central axis, said plate being mounted on said journal and having an outwardly extending web, spaced above said track and tilted on said journal so as to engage said track in rolling contact, thereby causing points on said central axis to describe orbital paths, a bracket mounted on the bottom of the plate and extending to a position adjacent the valve, a journal support mounted on said bracket and on said central axis, a second spherical journal on said support, said valve defining an upwardly open socket adapted to receive said second journal so as to be driven thereby in an orbital path, guide means on said valve and journal support for preventing the valve from rotating relative to said suport and means for connecting said pistons with said wobble plate.

2. The structure defined by claim 1 which includes a screw, means for adjustably mounting said screw in said track member, on said upright axis, said screw supporting said first spherical journal, and means for rotating said screw to raise and lower said journal to vary the angle of tilt of said wobble plate and thereby vary the stroke of said pistons.

3. The structure defined by claim 2 which includes a cover mounted on said block so as to enclose said valve mechanism, a gear fixed to said screw, a shaft rotatably mounted on and passing through said cover, and a pinion connected to said shaft and disposed in mesh with said gear, so as to permit the adjustment of said screw from the exterior of the cover.

4. The structure defined by claim 2 which includes a gear fixed to said screw for axial and rotative displacement therewith, an adjusting shaft mounted substantially parallel with said screw and having a wide faced pinion meshing with said gear so as to maintain meshing relation with said gear as it is displaced axially by said screw.

5. The structure defined by claim 2 wherein said screw defines an upwardly open spherical socket, said wobble plate defines a downwardly open spherical socket and said journal is a ball which rests in said sockets.

6. The structure defined by claim 1 which includes a cover mounted on said block so as to enclose said valve mechanism, a post on said cover and extending downwardly therefrom on said upright axis, a stud mounted on said wobble plate and extending upwardly therefrom on said central axis, a roller mounted on said stud, said roller having an upwardly converging conical surface, yieldable means mounted on said wobble plate and stud, and adapted to urge said roller outwardly along said stud to hold said conical surface in engagement with said post and a thrust bearing, comprising a washer of a bearing material comprising primarily "Teflon," mounted on said stud for engagement with said roller.

7. The structure defined by claim 1 wherein said guide means comprises a key mounted in said second journal, in perpendicular intersecting relation with said central axis, and an axial slot, intersecting the socket on said valve, to receive said key.

8. The structure defined by claim 1 which includes a bearing plate mounted on the lower side of said wobble plate web in position for rolling contact with said track.

9. The structure defined by claim 8 which includes a wear plate mounted on said track member and overlying said track for engagement by said bearing plate.

10. The structure of claim 9 wherein said wear plate and bearing plate are of stainless sheet steel.

11. The structure of claim 1 which includes a wear plate mounted on said track member and overlying said track.

12. The structure defined by claim 11 wherein said track member defines an upstanding boss having a bevelled edge which constitutes a track, and said wear plate comprises a metal cup fitted to the contours of said boss and track.

13. The structure defined by claim 1 wherein said valve, valve seat, track member and wobble plate are made of metals which are subject to corrosion by the fluids passing through the meter and said parts comprise finished surfaces including mutually sealing surfaces on the valve and seat, said parts having a coating of nickel on all of the surfaces except said sealing surfaces, to render them corrosion resistant.

14. A displacement mechanism for a fluid motor which comprises a cylinder block having an upright axis and defining cylinders arranged in circularly spaced relation about and parallel to said axis, a piston in each cylinder, a valve seat on the block defining a coaxial outlet port and a number of cylinder ports disposed in circularly spaced relation about said axis, a slide valve on said seat, means including a track on said block and a wobble plate mounted to roll on said track so as to nutate about said axis, means connecting said plate to move said valve in an orbital path, to valve said ports, said wobble plate having a projection for each cylinder, extending outwardly so as to intersect the vertical axis of the corresponding cylinder, a rod for each piston extending upwardly therefrom and around the corresponding projection and having a portion overlying said projection, bearing means for supporting said rod on said projection comprising a spherical journal and at least one spherical socket therefor, disposed between said projection and said portion so as to transmit thrust from one to the other.

15. The structure defined by claim 14 wherein the upper end of each piston rod is formed in a loop, with said overlying portion disposed transversely across the associated projection.

16. The structure defined by claim 15 wherein said piston rod includes a keeper positioned so as to project into said loop and toward the side of said projection opposite said bearing means, said keeper terminating at a distance from said projection which is less than the depth of said socket so as to prevent the escape of the journal therefrom.

17. The structure defined by claim 16 wherein said keeper is deformable from the position stated to increase the distance between it and the projection to an amount greater than the depth of the socket so as to permit removal or installation of said rod and journal on said projection.

18. The structure defined by claim 14 wherein said bearing means comprises an upwardly open spherical socket defined by the projection, means fixed to depend from the overlying portion of said rod and having a downwardy open spherical socket and a spherical journal seated in said sockets.

19. The structure defined by claim 14 which includes means for limiting relative movement between said projection and said overlying portion, in directions to separate said bearing means, to a distance smaller than that required for the escape of said journal from said socket.

20. The structure defined by claim 19 wherein said limiting means is movable to and from limiting position.

21. A rod mounting structure comprising a laterally extending projection, a rod having a loop formed thereon, said projection entering said loop so a portion of the loop extends transversely of one side of the projection, bearing means, comprising a spherical journal and at least one spherical socket therefor, disposed between said projection and said portion so as to transmit thrust from one to the other.

22. The structure defined by claim 21 which includes means for limiting relative motion of said projection and said portion, in directions to separate said bearing means, to a distance smaller than that required for the escape of said journal from said socket.

23. The structure defined by claim 22 wherein said limiting means comprises a keeper extending between said loop element and said projection, on the side opposite said bearing means, said keeper being spaced from one of said projections a distance smaller than that required for the escape of said journal from said socket.

24. A piston comprising a rod having a loop at one end, said rod having parallel runs extending away from said loop, a bearing member mounted on the side of said loop opposite said runs and extending into said loop, and a guide plate, piston cup and follower plate fixed to the terminal portions of said runs.

25. The structure defined by claim 24 which includes a keeper mounted between the upper ends of said runs so as to project into said loop.

References Cited in the file of this patent

UNITED STATES PATENTS 2,021,882     Bechtold _____ Nov. 26, 1935